(12) United States Patent  (10) Patent No.: US 8,347,720 B2
De Los Santos et al.  (45) Date of Patent: Jan. 8, 2013

(54) MEMS TUNNELING ACCELEROMETER

(75) Inventors: Hector J. De Los Santos, Irvine, CA (US); Farrokh Mohamadi, Irvine, CA (US)

(73) Assignee: Tialinx, Inc., Newport Beach, CA (US)

( * ) Notice: Subject to any disclaimer, the term of this patent is extended or adjusted under 35 U.S.C. 154(b) by 290 days.

(21) Appl. No.: 12/826,605

(22) Filed: Jun. 29, 2010

(65) Prior Publication Data

US 2011/0314913 A1 Dec. 29, 2011

(51) Int. Cl.
*G01P 15/08* (2006.01)
(52) U.S. Cl. ............................. 73/514.16; 73/514.38
(58) Field of Classification Search .............. 73/514.16, 73/514.15, 514.36, 862.625, 105, 513.38, 73/514.32, 514.18, 514.21, 514.24, 514.38; 250/306
See application file for complete search history.

(56) References Cited

U.S. PATENT DOCUMENTS

| | | | | |
|---|---|---|---|---|
| 5,285,686 | A * | 2/1994 | Peters | 73/504.15 |
| 5,377,545 | A * | 1/1995 | Norling et al. | 73/514.18 |
| 5,563,344 | A * | 10/1996 | Kaiser et al. | 73/514.24 |
| 5,756,895 | A * | 5/1998 | Kubena et al. | 73/504.15 |
| 5,911,157 | A * | 6/1999 | Biebl | 73/514.16 |
| 6,901,800 | B2 * | 6/2005 | Niendorf et al. | 73/514.16 |
| 7,091,715 | B2 * | 8/2006 | Nemirovsky et al. | 73/514.26 |
| 7,094,622 | B1 * | 8/2006 | Cui et al. | 438/57 |

* cited by examiner

*Primary Examiner* — Helen C. Kwok
(74) *Attorney, Agent, or Firm* — Haynes and Boone, LLP

(57) ABSTRACT

A tunneling accelerometer includes a proof mass that moves laterally with respect to a cap wafer. Either the proof mass or the cap wafer includes a plurality of tunneling tips such that the remaining one of proof mass and the cap wafer includes a corresponding plurality of counter electrodes. The tunneling current flowing between the tunneling tips and the counter electrodes will thus vary as the proof mass laterally displaces in response to an applied acceleration.

15 Claims, 5 Drawing Sheets

TiPt/ Au
SiO2

Si wafer

Form
Tips

↓H1

Sacrificial Layer

Pattern/Deposit Anchors

Form Suspension

Bond Cap Wafer

Remove Sacrificial Layer

MEMS TUNNELING ACCELEROMETER

TECHNICAL FIELD

The present invention relates generally to accelerometers, and more particularly to a MEMS-based tunneling accelerometer with enhanced sensitivity.

BACKGROUND

MEMS-based developments for accelerometers can typically be classified into either a capacitive or a tunneling current architecture. In a capacitive MEMS accelerometer, movement of the proof mass moves an associated capacitor plate either closer or further from an opposing capacitor plate. In this fashion, the resulting capacitance for the capacitive accelerometer varies corresponding to the acceleration it experiences. The change is capacitance is inversely proportional to the square of the separation between the capacitor plates.

In contrast to capacitive accelerometers, tunneling accelerometers utilize a tunneling current that varies exponentially with the separation between the tunneling tip and the counter electrode. Thus, tunneling accelerometers typically offer better sensitivity since relatively small acceleration variations produce relatively larger responses in the exponentially-responding tunneling accelerometers as compared to square-power-responding capacitive accelerometers. A common architecture for tunneling accelerometers involves placing the tunneling tip on a cantilever end portion. An opposing proof mass responds to an applied acceleration by moving closer or further away from the tunneling tip. The flexibility of the cantilever is exploited through the application of a bias voltage between the cantilever end and one or more biasing electrodes to flex the cantilever appropriately so that the tunneling tip is within the tunneling range of the counter electrode. Note, however, that since the proof mass moves orthogonally to the cantilever longitudinal axis (i.e., either towards or away from the cantilever), there is always the danger of a sufficiently strong acceleration causing the tunneling tip to contact the counter electrode on the proof mass. Since the tunneling tip dimensions at the tip apex are typically on the order of just a few atoms, such a contact could readily damage the tunneling tip. Thus, stops or other means are required to prevent the contact, which decreases the achievable measurement range. In addition, the sensitivity of conventional tunneling architectures is limited by the single tunneling tip.

Accordingly, there is a need in the art for robust tunneling accelerometers with improved sensitivity.

SUMMARY

In accordance with one aspect of the invention, a tunneling accelerometer is provided that includes: a planar suspension wafer configured to define a proof mass suspended by springs, wherein the proof mass includes a plurality of counter electrodes, and wherein the springs are configured to allow displacement of the proof mass laterally in a plane defined by the planar suspension wafer in response to applied accelerations; and a cap wafer configured with a plurality of tunneling tips, the cap wafer being bonded to the suspension wafer such that the tunneling tips align with the counter electrodes in the absence of the applied accelerations.

In accordance with another aspect of the invention, a tunneling accelerometer is provided that includes: a planar suspension wafer configured to define a proof mass suspended by springs, wherein the proof mass includes a plurality of tunneling tips, and wherein the springs are configured to allow displacement of the proof mass laterally in a plane defined by the planar suspension wafer in response to applied accelerations; and a cap wafer configured with a plurality of counter electrodes, the cap wafer being bonded to the suspension wafer such that the tunneling tips align with the counter electrodes in the absence of the applied accelerations.

In accordance with yet another aspect of the invention, a method of measuring an applied acceleration is provided that includes the acts of: providing a proof mass configured to displace laterally with respect to an adjoining cap wafer, wherein the proof mass is configured with tunneling tips or counter electrodes and the cap wafer is configured with corresponding counter electrodes or tunneling tips; biasing the tunneling tips relative to the counter electrodes such that a tunneling current flows though tunneling tips to the counter electrodes; and measuring a change in the tunneling current in response to a lateral displacement of the proof mass relative to the cap wafer responsive to the applied acceleration, wherein the measured change is proportional to a magnitude of the applied acceleration.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

To provide a MEMS tunneling accelerometer with increased sensitivity, the proof mass is suspended so as to move orthogonally to the longitudinal axis for the tunneling tip. Thus, the proof mass moves laterally with regard to the tip's longitudinal axis. In this fashion, the need for stops to prevent the tunneling tip from contacting the counter electrode is eliminated. Moreover, as will be explained further herein, the sensitivity for such a lateral movement design is readily scaled as desired by using the appropriate plurality of tunneling tips. In this fashion, the achievable sensitivity is markedly increased with regard to conventional tunneling accelerometer architectures in which the proof mass moves parallel to the tunneling tip longitudinal axis.

Figure 1:
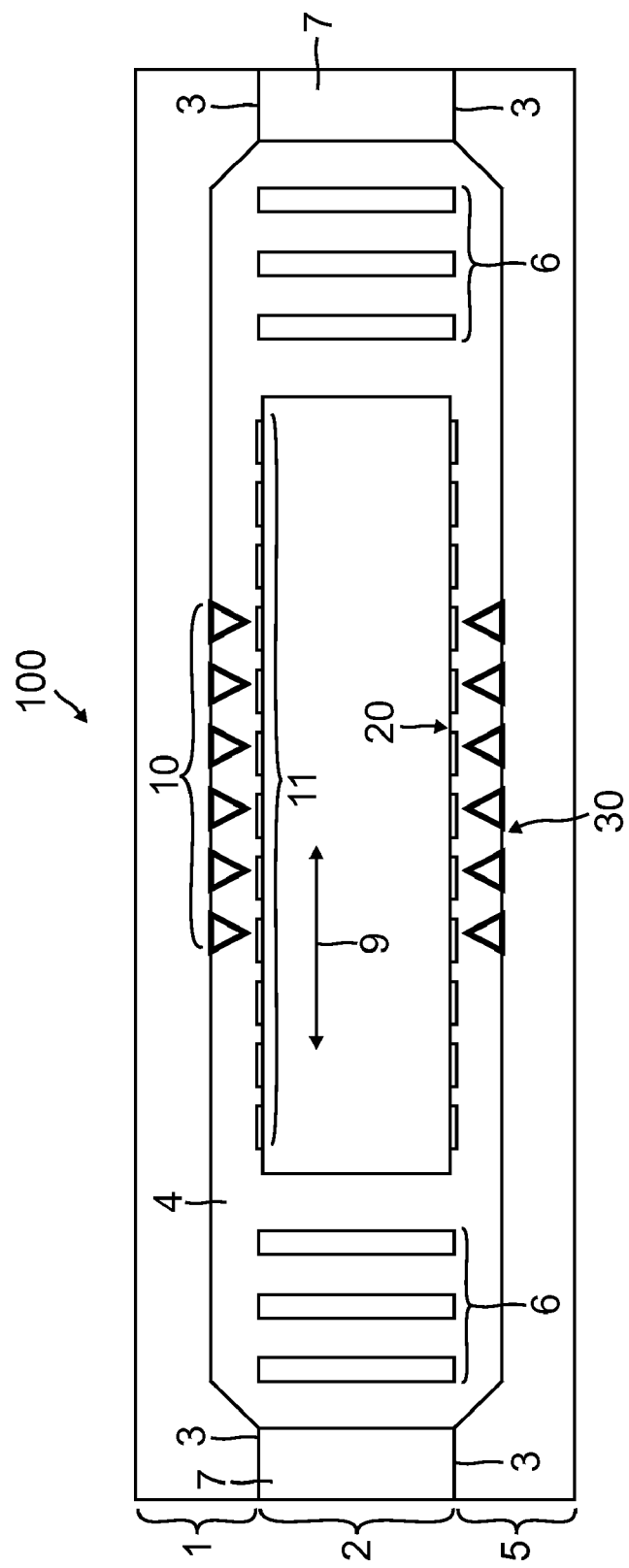
FIG. 1 is a cross-sectional view of a MEMS tunneling accelerometer in accordance with an embodiment of the invention.

Turning now to FIG. 1, a MEMS tunneling accelerometer 100 includes a proof mass 2 having a surface configured with a plurality of counter electrodes 11. The counter electrodes comprise deposited metal and thus protrude from the proof mass surface. As seen in the cross-sectional view of FIG. 1, the proof mass surface thus effectively forms alternating grooves with regard to the protruding counter electrodes. Tunneling current flows between a plurality of tunneling tips 10 formed on a tunneling tip substrate 1 adjacent to the proof mass. Note that separation between the tunneling tip substrate and the proof mass does not change. Instead, the proof mass moves laterally with regard to the tunneling tip substrate, which is stationary in accelerometer 100. In alternative embodiments discussed further herein, the counter electrodes may be formed on a stationary substrate whereas the tunneling tips are on the proof mass.

Although the separation between the proof mass and the tunneling tip substrate does not change, the proof mass is suspended by suspension members 6 such that the proof mass can move laterally (indicated by arrow 9) with regard to the tunneling tip substrate. Another plurality of counter electrodes 20 may be deposited on an opposing surface for the proof mass that faces a second tunneling tip substrate 5. Thus, additional tunneling current may flow between counter electrodes 20 and an opposing plurality of tunneling tips 30 on second tunneling tip substrate 5. End portions 7 of the substrate are secured to substrates 1 and 5 through junctions 3.

Figure 2:
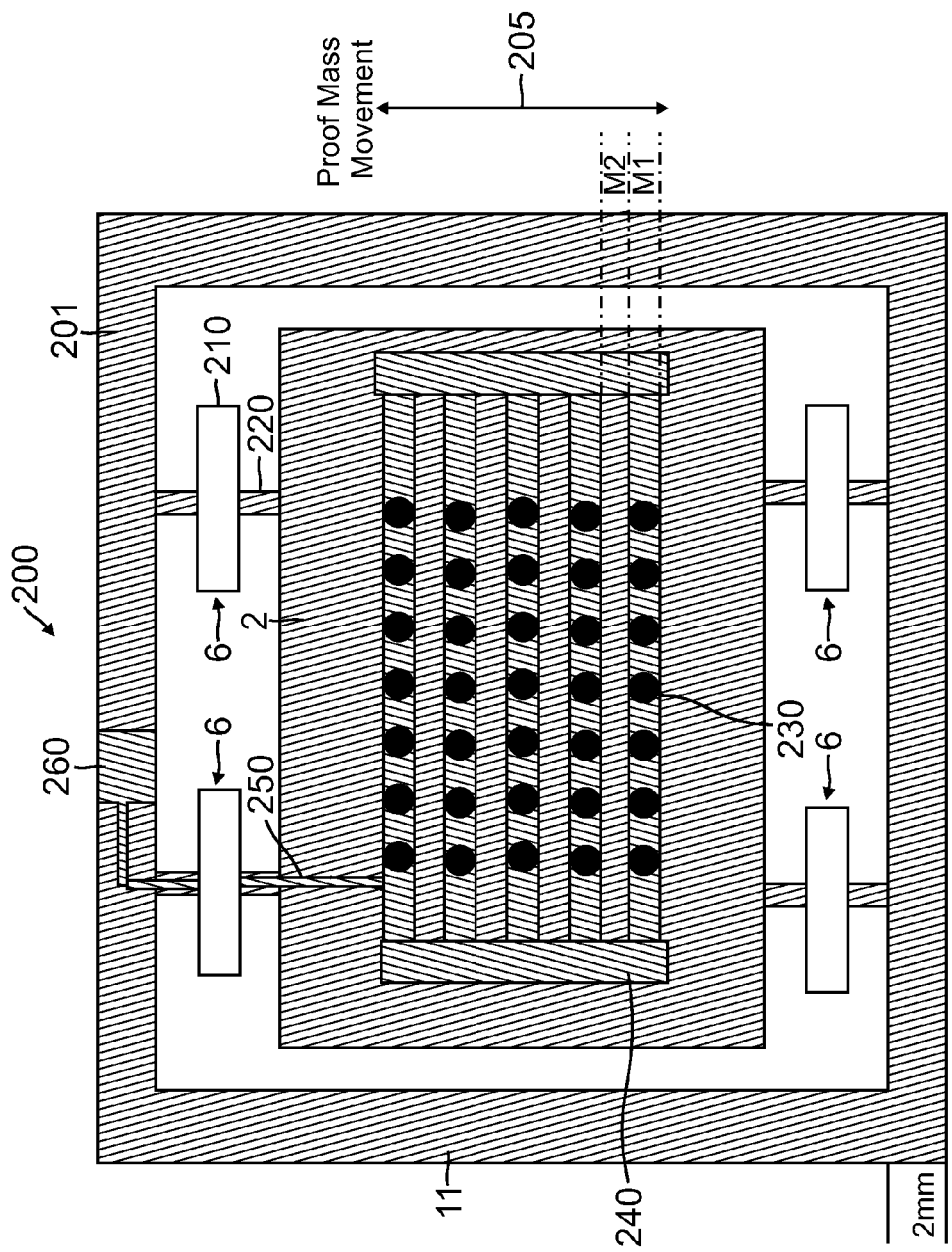
FIG. 2 is a plan view of the suspension wafer in the accelerometer of FIG. 1.

FIG. 2 shows a plan view of a suspension wafer 200 micromachined to form proof mass 2. A plurality of metal traces form counter electrodes 11. Proof mass 2 is connected to a perimeter 201 of wafer 200 through springs or suspension members 6. In one embodiment, perimeter 201 has a width of 2 mm. Suspension members 6 are configured such that proof mass 200 can displace in x-direction 205 with regard to the remainder of wafer 200 but is held relative rigidly in other dimensions. To allow such displacement, suspension members 6 include relatively-thin members or beams 210 that can readily flex to allow movement of proof mass in dimension 205. Beams 210 connect to perimeter 205 and proof mass 2 through relatively thick linkages 220 to prevent displacement of proof mass 2 in other dimensions. The length of the proof mass in a y-direction orthogonal to x-direction 205 may be 23 mm whereas the width in x-direction 205 may be 17 mm. For such an embodiment, linkages 210 may be displaced from their adjacent proof mass ends by 5 mm.

Similarly, the width M1 for each counter electrode 11 may be less than 0.1 micron whereas the separation M2 between adjacent counter electrodes may also be less than 0.1 micron. The thickness of the metal (for example, gold or an TiPt/Au alloy) used to form the counter electrodes may rang from 0.1 micron to 1 micron or any other suitable value. Given such a width and spacing of the parallel-arrayed counter electrodes, the proof mass may readily be configured with thousands of counter electrodes. Each counter electrode would thus align with a corresponding linear array of tunneling tips on one of the substrates 3 and 5 of FIG. 1 when the proof mass is at rest. The alignment of the tunneling tips is thus represented by shadows 230 in FIG. 2. Thus, the tunneling current will be at a maximum in the presence of no acceleration but will decrease as the tunneling tips are displaced away from their corresponding counter electrodes.

To allow detection of the tunneling current, the counter electrodes are electrically coupled to each other through, for example, traverse conductors 240 and also to a conductor 250 so as to couple to a pad 260 through an adjacent suspension member conductor. The desired metal conductors and counter electrodes are all readily formed simultaneously though conventional MEMS processing techniques as known in the art.

Figure 3:
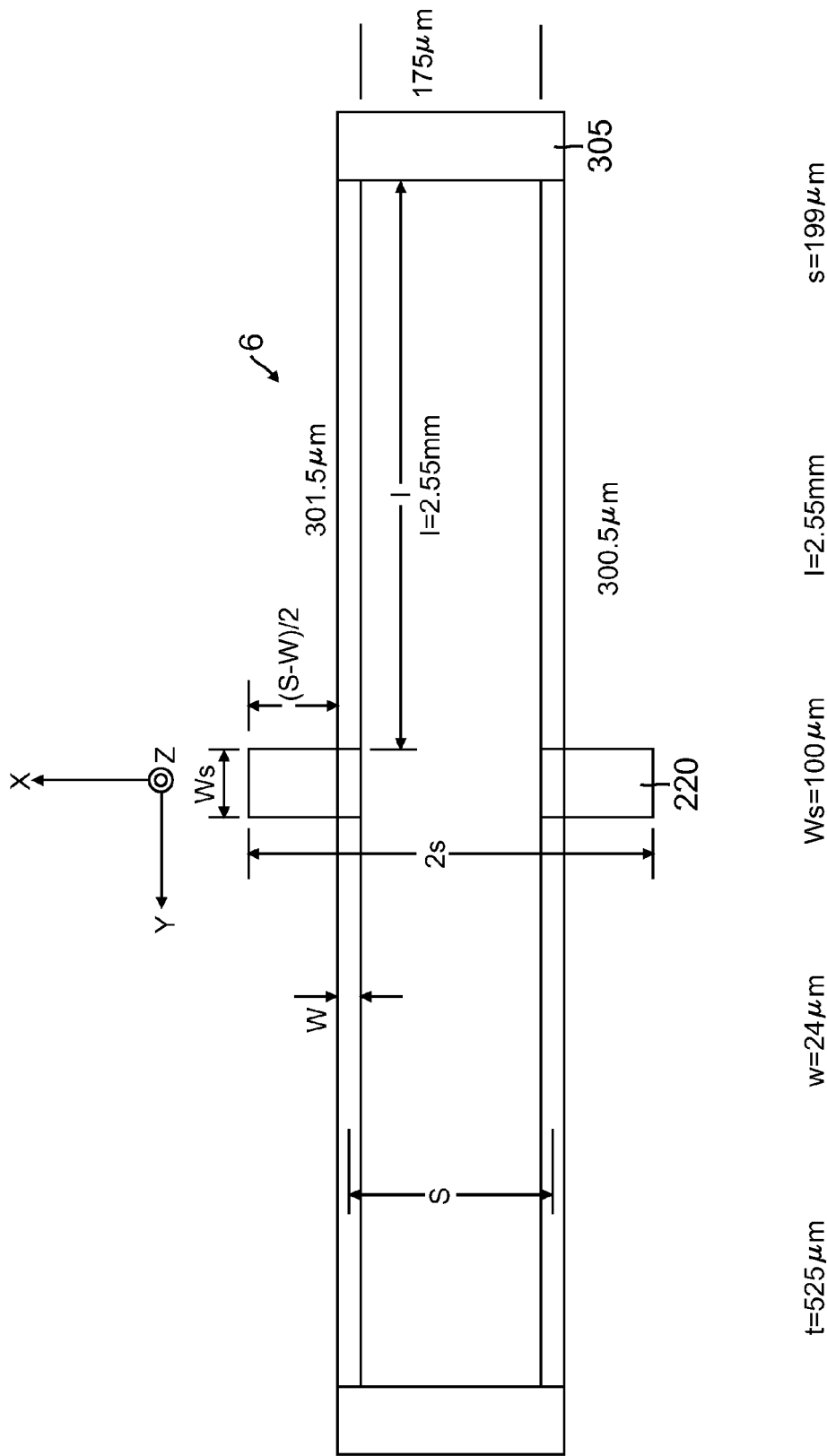
FIG. 3 is a close-up plan view of a spring for the suspension wafer of FIG. 2.

Further details for an example spring 6 of FIGS. 1 and 2 are illustrated in FIG. 3. Beams 210 have a width of twenty-four microns whereas elbows 305 and linkages 220 have a width of 100 microns. Since each beam 210 has a length of 2.55 mm, spring 6 will readily flex in the x-direction but be relatively rigid in the y-direction. Each elbow 305 may have a length of 175 microns. The linkages 220 may each be approximately 300 microns in length.

The tunneling current that results between the tunneling tips and the counter electrodes will have a magnitude that is set by the smallest tunneling tip/counter electrode separation and is established by a bias voltage developed by a bias circuit (not illustrated) that is analogous to the bias circuits used in conventional tunneling accelerometers. Similarly, a conventional detection circuit (not illustrated) detects the tunneling current magnitude changes in response to applied acceleration in an analogous fashion as performed in conventional tunneling accelerometers.

Figure 4A:
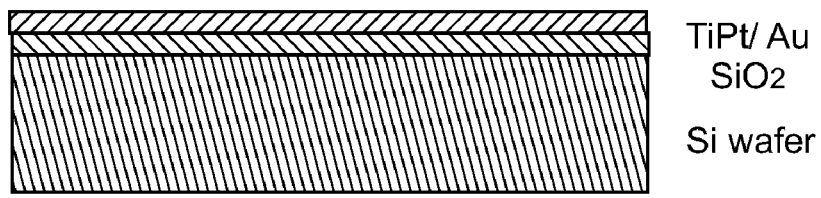
FIG. 4a is a cross-sectional view of a suspension wafer prior to formation of the tunneling tips.
Figure 4B:
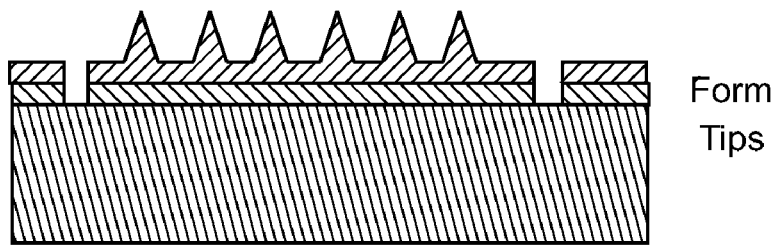
FIG. 4b illustrates the suspension wafer of FIG. 4a after the formation of the tunneling tips.
Figure 4C:
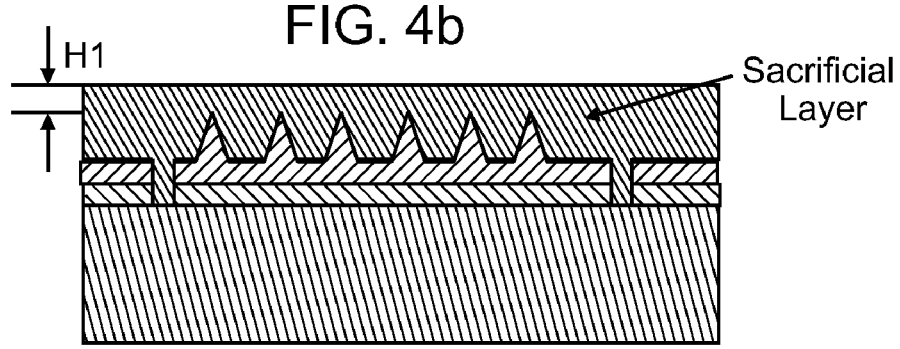
FIG. 4c illustrates the suspension wafer of FIG. 4b after the deposition of a sacrificial layer.
Figure 4D:
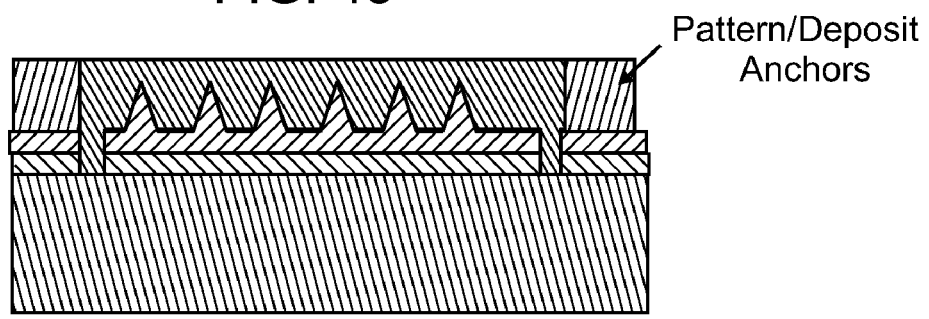
FIG. 4d illustrates the suspension wafer of FIG. 4c after the deposition of anchors.
Figure 4E:
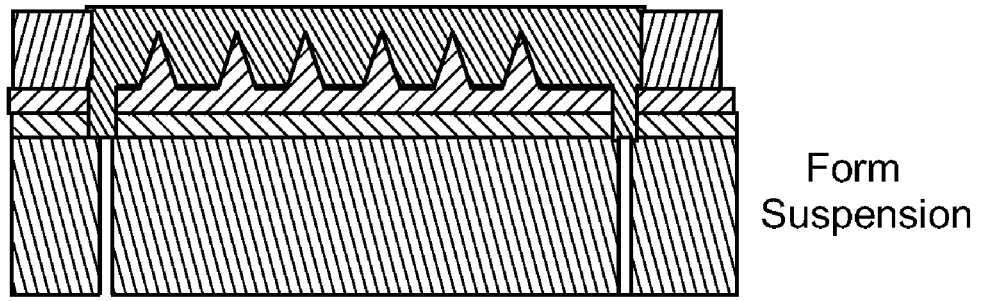
FIG. 4e illustrates the suspension wafer of FIG. 4d after the formation of the suspensions.
Figure 4F:
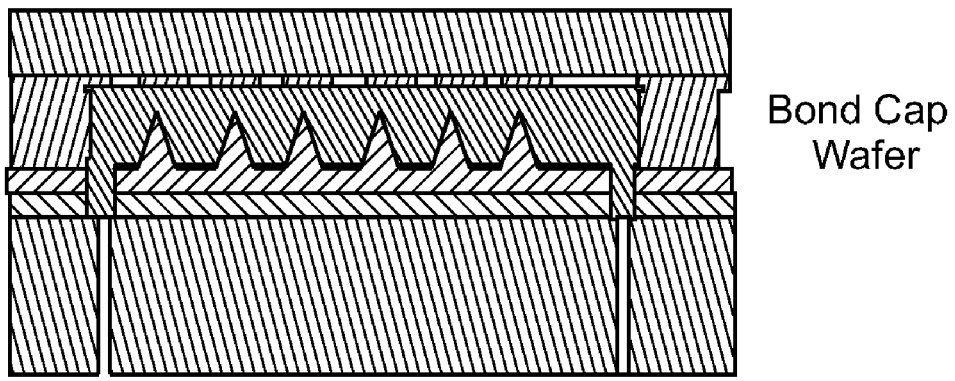
FIG. 4f illustrates the bonding of the cap wafer to the suspension wafer of FIG. 4e.

One can readily appreciate that the spring mass may hold the tunneling tip array as opposed to the counter electrodes. Example manufacturing techniques for the construction of such embodiment will now be described. FIG. 4a shows a cross-sectional view of a suspension wafer with deposited layers of silicon dioxide (SiO2) and TiPt/Au. As seen in FIG. 4b, the tunneling tips are defined on the suspension wafer by a suitable method, e.g., FIB (Focused-Ion Beam) lithography and ion milling. In addition, selected portions of the wafer are exposed corresponding to what will be the perimeter of the proof mass holding the tunneling tips. A sacrificial layer is deposited with a thickness that is H1 Angstroms greater than the tip height as illustrated in FIG. 4c. To permit later coupling to a cap wafer holding the counter electrodes, anchors of thickness equal to the sacrificial layer are deposited as shown in FIG. 4d. The springs or suspension members such as discussed previously pre defined by deep-reactive ion etching from the opposite side of the suspension wafer as illustrated in FIG. 4e. A cap wafer having an array of counter electrodes analogous to those discussed with regard to FIG. 2 may then be bonded to the suspension wafer as shown in FIG. 4f. The cap wafer has pads corresponding to the anchors discussed with regard to FIG. 4d. After the sacrificial layer is removed as shown in FIG. 4g, the counter electrodes are then separated from the tunneling tips by the dimension H1 discussed with regard to FIG. 4c.

Figure 4G:
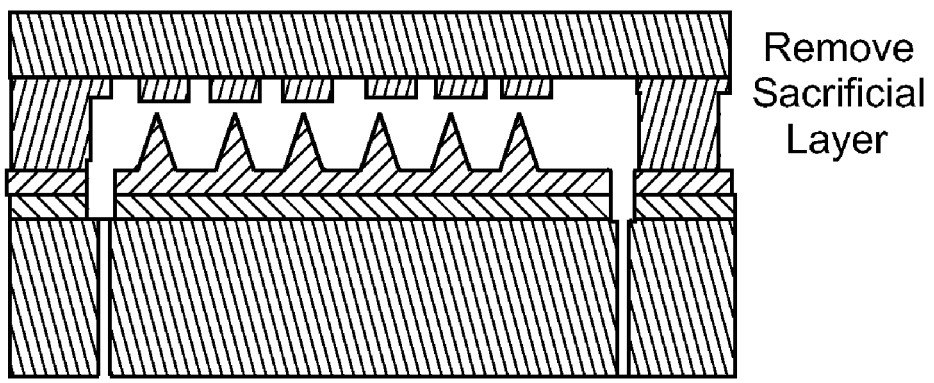
FIG. 4g illustrates the bonded cap wafer and suspension wafer of FIG. 4f after the removal of the sacrificial layer.

As an alternative to etching the suspension as shown in FIG. 4e, the cap wafer may instead be bonded to the not-yet-suspension-etched suspension wafer analogously as described with regard to FIG. 4g. The suspension may then be etched and the sacrificial layer removed to complete the accelerometer assembly.

Regardless of whether the proof mass is configured with the tunneling tips or the counter electrodes, the resulting embodiments advantageously require no stops to prevent the contact with the tunneling tips since the relative movement of the proof mass is lateral to tunneling tips (or counter electrodes if the proof mass is configured with the tunneling tips). In addition, the sensitivity of the resulting accelerometers is advantageously increased by the use of multiple tunneling tips—whereas such a multiplication of the tunneling currents is unachievable with the prior art cantilever designs. The multiplication of the tunneling tips regularizes and averages out the magnitude of the tunneling current and thus makes the resulting total tunneling tip current robustly reproducible from accelerometer to accelerometer.

It will be obvious to those skilled in the art that various changes and modifications may be made without departing from this invention in its broader aspects. The appended claims encompass all such changes and modifications as fall within the true spirit and scope of this invention.

We claim:

1. A tunneling accelerometer, comprising:
    a planar suspension wafer configured to define a proof mass suspended by springs, wherein the proof mass includes a plurality of counter electrodes, and wherein the springs are configured to allow displacement of the proof mass laterally in a first plane defined by the planar suspension wafer in response to applied accelerations; and
    a cap wafer configured with a plurality of tunneling tips arranged in a second plane parallel to the first plane defined by the planar suspension wafer, the cap wafer being bonded to the suspension wafer such that the tunneling tips align with the counter electrodes in the absence of the applied accelerations.

2. The tunneling accelerometer of claim 1, wherein the plurality of counter electrodes comprises a plurality of parallel-arranged linear counter electrodes.

3. The tunneling accelerometer of claim 1, wherein a tunneling separation between the counter electrodes and the tunneling tips ranges approximately from 10 to 100 Angstroms.

4. The tunneling accelerometer of claim 1, wherein the plurality of counter electrodes are arranged on opposing sides of the proof mass, and wherein the cap wafer comprises a first and a second cap wafer bonded to the opposing sides of the proof mass.

5. The tunneling accelerometer of claim 2, wherein the plurality of counter electrodes comprises at least one thousand counter electrodes.

6. The tunneling accelerometer of claim 5, wherein the plurality of counter electrodes comprises multiple thousands of counter electrodes.

7. A tunneling accelerometer, comprising:
    a planar suspension wafer configured to define a proof mass suspended by springs, wherein the proof mass includes a plurality of tunneling tips, and wherein the springs are configured to allow displacement of the proof mass laterally in a first plane defined by the planar suspension wafer in response to applied accelerations; and
    a cap wafer configured with a plurality of counter electrodes arranged in a second plane parallel to the first plane defined by the planar suspension wafer, the cap wafer being bonded to the suspension wafer such that the tunneling tips align with the counter electrodes in the absence of the applied accelerations.

8. The tunneling accelerometer of claim 7, wherein the plurality of counter electrodes comprises a plurality of parallel-arranged linear counter electrodes.

9. The tunneling accelerometer of claim 7, wherein a tunneling separation between the counter electrodes and the tunneling tips ranges approximately from 10 to 100 Angstroms.

10. The tunneling accelerometer of claim 7, wherein the plurality of tunneling tips are arranged on opposing sides of the proof mass, and wherein the cap wafer comprises a first and a second cap wafer bonded to the opposing sides of the proof mass.

11. The tunneling accelerometer of claim 8, wherein the plurality of counter electrodes comprises at least one thousand counter electrodes.

12. The tunneling accelerometer of claim 11, wherein the plurality of counter electrodes comprises multiple thousands of counter electrodes.

13. A method of measuring an applied acceleration with regard to a planar proof mass suspended by springs, wherein the proof mass includes a plurality of tunneling tips or counter electrodes arranged in a first plane defined by the planar proof mass and the cap wafer includes corresponding counter electrodes or tunneling tips arranged in a second plane parallel to the first plane, the method comprising:
    biasing the tunneling tips relative to the counter electrodes such that a tunneling current flows though the tunneling tips to the counter electrodes; and
    applying a lateral acceleration to the planar proof mass such that the planar proof mass displaces laterally parallel to the first and second planes, the lateral displacement being opposed by a resilient bias from the springs; and
    measuring a change in the tunneling current in response to the lateral displacement of the proof mass relative to the cap wafer responsive to the applied lateral acceleration, wherein the measured change in the tunneling current is proportional to a magnitude of the applied lateral acceleration.

14. The method of claim 13, wherein the proof mass is configured with the tunneling tips and the cap wafer is configured with the corresponding counter electrodes.

15. The method of claim 13, wherein the proof mass is configured with the counter electrodes and the cap wafer is configured with the corresponding tunneling tips.

* * * * *